(12) United States Patent
Johansson

(10) Patent No.: US 11,701,768 B2
(45) Date of Patent: Jul. 18, 2023

(54) ELECTRIC POWER TOOL

(71) Applicant: ATLAS COPCO INDUSTRIAL TECHNIQUE AB, Stockholm (SE)

(72) Inventor: Karl Göran Johansson, Saltsjö-Boo (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 17/589,183

(22) Filed: Jan. 31, 2022

(65) Prior Publication Data

US 2022/0152807 A1 May 19, 2022

Related U.S. Application Data

(63) Continuation of application No. 15/578,016, filed as application No. PCT/EP2016/063474 on Jun. 13, 2016, now abandoned.

(30) Foreign Application Priority Data

Jun. 30, 2015 (SE) .................................... 1550912-8

(51) Int. Cl.
*B25F 5/00* (2006.01)
*B25B 21/00* (2006.01)

(52) U.S. Cl.
CPC .............. *B25F 5/001* (2013.01); *B25B 21/00* (2013.01)

(58) Field of Classification Search
CPC .... B25F 5/001; B25F 5/00; B25F 5/02; B23P 15/14; F16D 3/04; B25B 21/00;
(Continued)

(56) References Cited

U.S. PATENT DOCUMENTS

| 61,581 A | * | 1/1867 | Taylor | F16D 3/185 464/158 |
| 2,346,058 A | * | 4/1944 | Waldron | F16D 3/2052 464/115 |

(Continued)

FOREIGN PATENT DOCUMENTS

| DE | 9015886 U1 | 2/1991 |
| JP | S5655714 A | 5/1981 |

(Continued)

OTHER PUBLICATIONS

Chinese Office Action dated Dec. 11, 2020 issued in Chinese Application No. 201680037930.1 (which is a Chinese counterpart of parent U.S. Appl. No. 15/578,016).

(Continued)

*Primary Examiner* — Dariush Seif
(74) *Attorney, Agent, or Firm* — Holtz, Holtz & Volek PC

(57) ABSTRACT

An electric power tool includes an electric motor with a motor gear, an output shaft with an input gear, a coupling that connects the motor gear to the input gear, and a housing that houses the motor, the motor gear, the coupling and the input gear. The coupling includes a shaft portion and two connective portions arranged at opposite ends of the shaft portion for connection to the motor gear and input gear, respectively. The motor gear and the input gear, each, have a cambered profile allowing a tilting movement of the coupling with respect to an axial position of one of the motor gear and the input gear that has a cambered profile.

2 Claims, 2 Drawing Sheets

(58) Field of Classification Search
CPC ......... B25B 21/02; B25B 23/14; B25D 17/10; B26B 15/00
USPC .................................................. 464/147, 75
See application file for complete search history.

(56) References Cited

U.S. PATENT DOCUMENTS

| | | | | |
|---|---|---|---|---|
| 2,430,683 | A * | 11/1947 | O'Malley | F16D 3/20 464/154 |
| 2,857,749 | A * | 10/1958 | Fabbri | F16D 3/74 464/88 |
| 3,174,302 | A * | 3/1965 | Pomper | F16D 3/185 464/154 |
| 3,313,124 | A * | 4/1967 | Filepp | F16D 3/185 464/154 |
| 3,734,205 | A * | 5/1973 | Maurer | B25B 21/026 173/93.5 |
| 3,874,194 | A * | 4/1975 | Filepp | F16D 3/185 464/154 |
| 4,033,144 | A * | 7/1977 | Allen | F16D 3/62 464/84 |
| 4,307,797 | A | 12/1981 | Belansky | |
| 4,318,627 | A * | 3/1982 | Morin | F16C 11/0638 403/140 |
| 4,357,137 | A * | 11/1982 | Brown | F16D 1/101 464/159 |
| 4,373,925 | A * | 2/1983 | Fickelscher | F16D 3/185 74/462 |
| 4,416,645 | A * | 11/1983 | Fredericks | F16D 3/79 464/99 |
| 4,530,674 | A * | 7/1985 | Rauch | F16D 3/72 464/158 |
| 4,751,855 | A | 6/1988 | Hudson | |
| 4,906,123 | A | 3/1990 | Weskamp et al. | |
| 4,913,681 | A * | 4/1990 | Green | F16D 3/185 464/169 |
| 4,950,101 | A * | 8/1990 | Artzberger | E01C 19/40 425/452 |
| 5,139,460 | A * | 8/1992 | Hoyt, III | F16D 3/68 464/154 |
| 5,197,786 | A * | 3/1993 | Eschenburg | B60B 37/00 301/124.1 |
| 5,366,286 | A * | 11/1994 | Ruttimann | A47J 43/0705 366/331 |
| 5,398,454 | A * | 3/1995 | Berner | B24B 23/04 451/357 |
| 5,595,541 | A * | 1/1997 | Ducugnon | F16D 3/74 464/154 |
| 5,716,279 | A * | 2/1998 | Ham | F16D 3/76 464/159 |
| 5,810,472 | A * | 9/1998 | Penaranda | A47J 43/0711 220/601 |
| 5,890,965 | A * | 4/1999 | Deeg | F16D 3/725 464/181 |
| 6,123,157 | A * | 9/2000 | Barnes | B25F 5/006 279/157 |
| 6,283,868 | B1 * | 9/2001 | Clarke | F16D 3/74 156/137 |
| 6,506,120 | B1 * | 1/2003 | Lockwood | F16D 3/725 464/49 |
| 6,671,475 | B2 * | 12/2003 | Katada | G03G 15/1615 464/154 |
| 6,843,727 | B2 * | 1/2005 | Counter | F16D 3/54 464/903 |
| 7,383,750 | B2 * | 6/2008 | Menjak | F16H 55/17 74/440 |
| 7,625,290 | B2 * | 12/2009 | Hodjat | F16D 3/76 464/88 |
| 7,763,336 | B2 * | 7/2010 | Clarke | C08G 18/10 428/36.9 |
| 8,096,212 | B2 * | 1/2012 | Su | B25G 3/38 81/177.85 |
| 9,441,678 | B2 * | 9/2016 | Nelson | F16D 9/06 |
| 9,642,494 | B1 * | 5/2017 | Brun | B02C 23/36 |
| 9,976,332 | B2 * | 5/2018 | Scheuring | F16D 7/06 |
| 2004/0253912 | A1 * | 12/2004 | Menjak | F16H 55/06 476/67 |
| 2006/0105844 | A1 * | 5/2006 | Sweet | F16D 3/76 464/102 |
| 2011/0197719 | A1 * | 8/2011 | Neitzell | B25F 5/001 81/177.75 |
| 2016/0207178 | A1 * | 7/2016 | Chen | B25B 13/481 |
| 2016/0325360 | A1 * | 11/2016 | Martin | B23Q 1/009 |
| 2018/0290284 | A1 * | 10/2018 | Johansson | F16D 3/72 |

FOREIGN PATENT DOCUMENTS

| | | |
|---|---|---|
| JP | S61105332 A | 5/1986 |
| JP | H029508 A | 1/1990 |
| JP | H03272348 A | 12/1991 |
| JP | 2005066804 A | 3/2005 |

OTHER PUBLICATIONS

Chinese Office Action dated May 8, 2020 issued in Chinese Application No. 201680037930.1 (which is a Chinese counterpart of parent U.S. Appl. No. 15/578,016).

International Search Report (ISR), Written Opinion, and International Preliminary Report on Patentability (IPRP) dated Sep. 2, 2016 issued in International Application No. PCT/EP2016/063474 (which is an International counterpart of parent U.S. Appl. No. 15/578,016).

Japanese Office Action (and English language translation thereof) dated Apr. 20, 2020 issued in Japanese Application No. 2018-500324 (which is a Japanese counterpart of parent U.S. Appl. No. 15/578,016).

Office Action (Final Rejection) dated Dec. 31, 2020 issued in U.S. Appl. No. 15/578,016.

Office Action (Final Rejection) dated Nov. 14, 2020 issued in parent U.S. Appl. No. 15/578,016.

Office Action (Non-Final Rejection) dated Jul. 15, 2020 issued in parent U.S. Appl. No. 15/578,016.

Office Action (Non-Final Rejection) dated Nov. 25, 2019 issued in parent U.S. Appl. No. 15/578,016.

* cited by examiner

ELECTRIC POWER TOOL

CROSS-REFERENCE TO RELATED APPLICATIONS

This application is a Continuation Application of U.S. application Ser. No. 15/578,016, filed Nov. 29, 2017, which is a National Phase Entry of Application No. PCT/EP2016/063474, filed Jun. 13, 2016, which is based upon and claims the benefit of priority from Swedish Patent Application No. 1550912-8, filed Jun. 30, 2015, the entire contents of all of which are incorporated herein by reference.

FIELD

The invention relates to an electric power tool with an electric motor that is connected to an output shaft via a power transmission.

BACKGROUND

Electric torque delivering power tools, such as screw drivers, are used in a wide variety of applications. Different applications set different demands with respect to performance parameters such as speed and torque level. Therefore, there is a desire to produce electric power tools in a modular shape such that components such as the motor and reduction gearings may be exchanged for different ones within the existing tool housing, without the necessity of time consuming and costly adaptations.

Modular power tools typically include a casing that is adapted to receiving different motors and/or different gearings depending on specific needs or applications. A problem related to such power tools is however that the power transmission is normally not so easily adapted to the different modules. Normally, the power transmission is produced as rigid as possible so as to transmit the torque in a best manner with as little losses as possible. This may result in a power transmission with poor tolerances for axial un-alignment, whereby harmful stress may be created along the power transmission or in the motor or output shaft. Further such power transmission is not configured to be replaced or adapted for different applications, Hence, there is a need of a power tool with a power transmission that allows for flexible adaptation to modules of different sizes and that provides a liable power transmission with an acceptable tolerance to axial un-alignment of components involved in the power transmission.

SUMMARY OF THE INVENTION

An object of the invention is to provide an electric power tool that makes it possible to replace parts of the power tool as modules while at the same time providing an efficient and liable power transmission.

This object is achieved by the invention according to claim 1, which relates to an electric power tool comprising an electric motor connected to a motor gear; an output shaft connected to an input gear; a coupling that connects the motor gear to the input gear; and a housing that houses the motor, motor gear, coupling and input gear. The coupling includes a shaft portion and two connective portions arranged at opposite ends of the shaft portion for connection to the motor gear and input gear, respectively, wherein at least one of the motor gear and the input gear has a cambered profile allowing a tilting movement of the coupling with respect to the axial position of the one of the motor gear and the input gear that has a cambered profile.

This arrangement has an improved tolerance to axial un-alignment of components involved in the power transmission with respect to conventional arrangements.

Further, with this arrangement the coupling may be easily adapted to different modules of different length by simply replacing the shaft portion of the coupling with a shaft portion of a different length.

Other features and advantages of the invention will be apparent from the independent claims and from the detailed description of the shown embodiment.

SHORT DESCRIPTION OF THE DRAWINGS

In the following detailed description reference is made to the accompanying drawings, of which:

DETAILED DESCRIPTION OF THE SHOWN EMBODIMENT OF THE INVENTION

Figure 1:
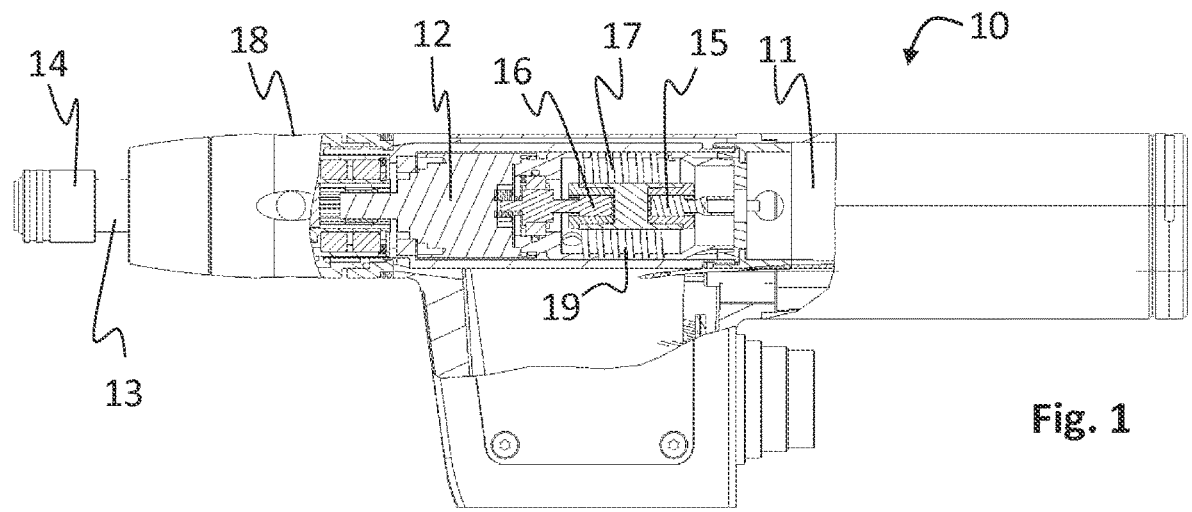
FIG. 1 shows a power tool according to a specific embodiment of the invention.

In FIG. 1 a power tool according to a specific embodiment of the invention is shown. The shown power tool 10 is an electric torque delivering power tool that includes a motor 11, which is connected via a power transmission including a reduction gear 12 to an output shaft 13. A bit holder 14 is arranged on the outer end of the output shaft 13 for insertion of a screw or nut connectable bit.

The power transmission further includes a motor gear 15 that is driven by the motor 11 and connected via a coupling 17 to an input gear 16 of the reduction gear 12. A housing 18 is arranged to house the motor 11 and the power transmission. The output shaft 13 extends through a front end of the housing 18. In the shown embodiment a torsion spring 19 is arranged to take up reaction forces between the reduction gear 12 and the housing 18. The shown torsion spring 19 is a helical spring that is tightly fitted inside a tubular portion of the housing 18.

Figure 2:
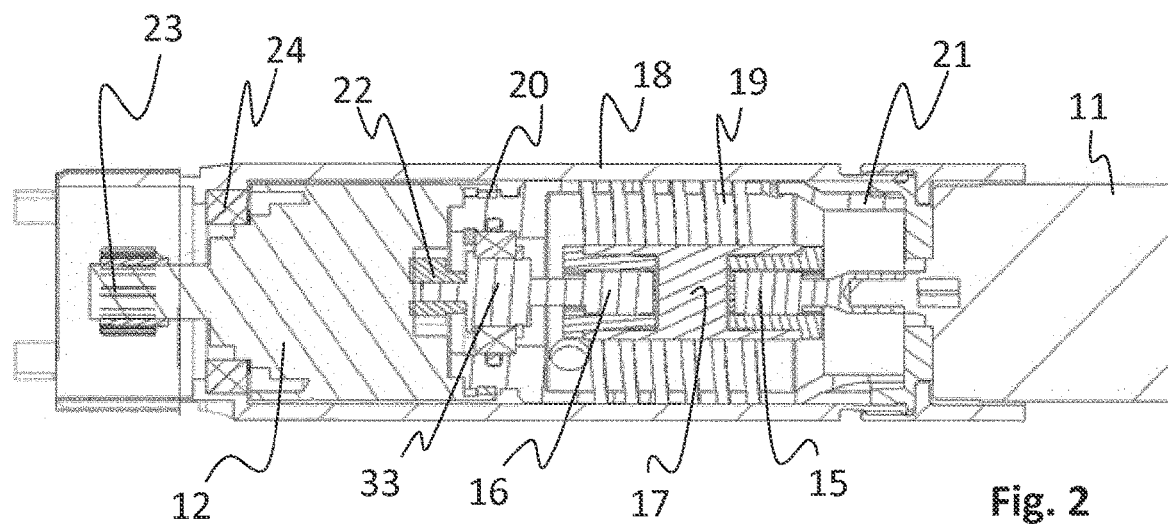
FIG. 2 is a sectional view of the power transmission of the power tool in FIG. 1.

In FIG. 2 a sectional view of the power transmission of the power tool 10 is shown. In the shown embodiment the reduction gear 12 is a planetary gear driven by a sun gear 22 that is connected to the input gear 16 via a planet gear connection 33. An output gear 23 of the planetary gear is connected to the planet carrier (not shown) of the planetary gear. A gear rim (not shown) is arranged outside the planet carrier. The gear rim is arranged in a single bearing 24 with respect to the housing. Hence, the gear rim is not fixed to the housing, but is arranged to rotate against the action of the torsion spring 19. This is just an exemplary embodiment and the planetary gear may just as well be fully supported by the housing 18 and the torsion spring may be dispensed with. Inside of the torsion spring 19 the inventive coupling 17 that connects the motor gear 15 to the input gear 16 is shown.

Figure 3:
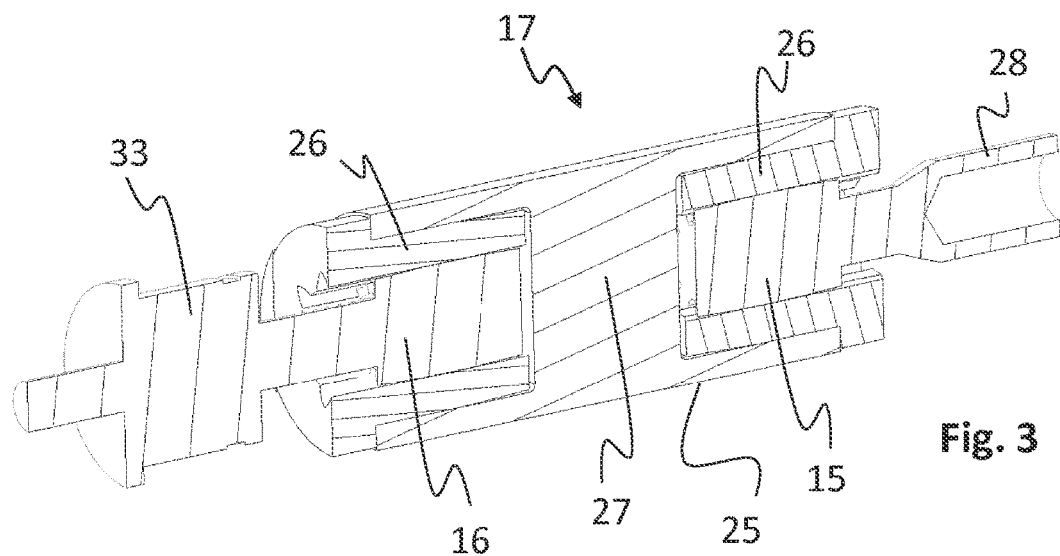
FIG. 3 is a perspective cut view of a coupling in accordance with the invention.
Figure 4:
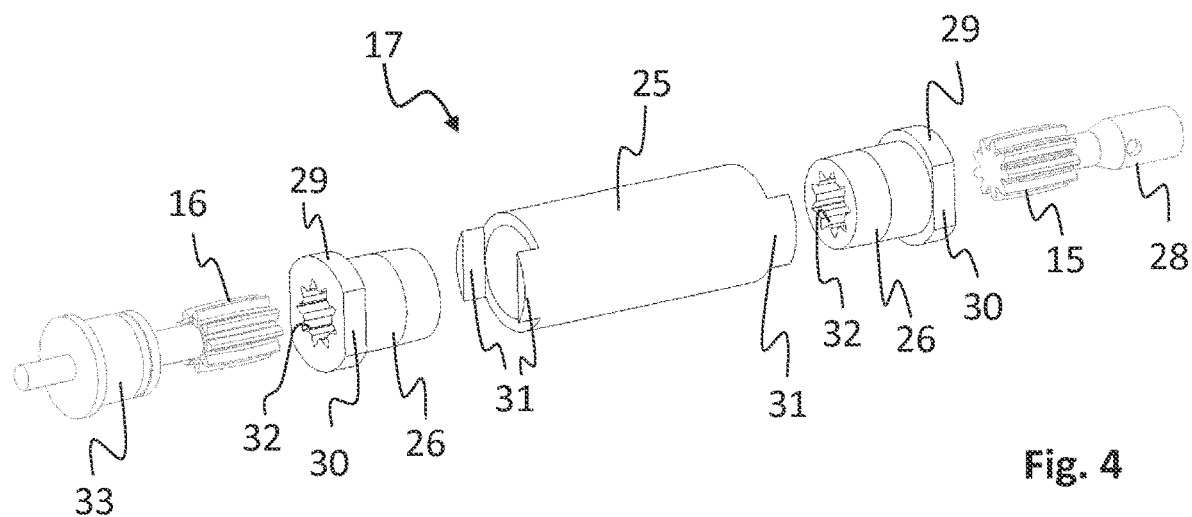
FIG. 4 is an exploded view of a coupling in accordance with the invention.

The coupling 17 is shown in detail in FIGS. 3 and 4. It includes a shaft portion 25 and two connective portions 26 arranged at opposite ends of the shaft portion 25 for connection to the motor gear 15 and input gear 16, respectively. The motor gear 15 is connected to a motor shaft 28 that is driven by the motor and the input gear is connected to a reduction gear via a reduction gear connection 33.

As is shown in FIG. 4 the motor gear 15 and the input gear 16 of the specific embodiment have cambered profiles allowing a tilting movement with respect to the axial position of the coupling 17. The cambered profile means that the toothed part of the gear has a radius that varies axially. The radius is as largest near the middle of the toothed gear and decreases in both directions from the maximum radius near the middle. The toothed gears 15 and 16 are to be arranged in meshing contact with the connective portions 26, which hence include a toothed or splined interior 32. The splined interior 32 includes straight splines with a same inner profile throughout its splined length. To achieve the best meshing interaction the curvature of the cambered teeth should have a part circular circumference that provides an equally good mesh with the splined interior 32 of the connective portions 26 irrespective of whether the connection is slightly tilted or perfectly straight.

In the shown embodiment both the motor gear 15 and the input gear 16 have a cambered gear profile. An effect is however achieved as soon as only one of the motor gear 15 and the input gear 16 has a cambered gear profile, allowing a tilting movement of the coupling 17 with respect to the axial position of the one of the motor gear 15 and the input gear 16 that has a cambered profile.

Both the connective portions 26 include splines for meshing connection to the motor gear 15 and input gear 16, respectively. Advantageously, the splined connective portions 26 of the coupling are plastic parts that are fitted inside the shaft portion 25. Preferably the connective portions 26 are produced with a tight tolerance so as to be press fitted inside the end openings of the shaft portion 25. An advantage of a press fitted arrangement is that no adhesive is needed.

The shaft portion 25 may be tube shaped, but it may also, as in the shown embodiment comprise a solid midsection 27. The solid midsection 27 may function as an axial stop and support for the connective portions 26. Further though, each connective portion 26 may be provided with a rim 29 that also functions as an axial stop and support for the connective portions 26, such that the solid midsection 27 is not needed for that purpose.

The rims 29 comprise recesses 30, in which guides 31 of the shaft portion 25 fit so as to lock the connective portions 26 and the shaft portion 25 from mutual rotation. The guides 31 may also include grip ends (not shown) for locking the connective portions 26 axially to the shaft portion 25. Typically though, such grip ends are not needed since the tight fit between the shaft portion 25 and the connective portions 26 is tight enough to guarantee that they will remain locked to each other.

Above, the invention has been described with reference to a specific embodiment. The invention is however not limited to this embodiment. It is obvious to a person skilled in the art that the invention comprises further embodiments within its scope of protection, which is defined by the following claims.

The invention claimed is:

1. An electric power tool comprising:
an electric motor with a motor gear;
an output shaft with an input gear;
a coupling that connects the motor gear to the input gear; and
a housing that houses the motor, the motor gear, the coupling, and the input gear,
wherein the coupling includes a shaft portion and two connective portions arranged at opposite ends of the shaft portion for connection to the motor gear and input gear, respectively,
wherein both of the motor gear and the input gear have a cambered profile allowing a tilting movement of the coupling with respect to axial positions of the motor gear and the input gear,
wherein both of the connective portions include splines for meshing connection to the motor gear and input gear, respectively,
wherein the shaft portion of the coupling has two openings at the opposite ends thereof, and includes guides provided at each of the two openings,
wherein the two connective portions of the coupling are plastic parts that are press fitted inside the two openings of the shaft portion, respectively,
wherein each of the connective portions includes a rim configured to abut against the shaft portion along an axial direction, the rim including recesses adapted to receive the guides of the shaft portion so as to prevent mutual rotation between the connective portions and the shaft portion, and
wherein the motor gear and the input gear are not attached to each other, whereby the motor gear and the input gear are tiltable independently of each other.

2. The electric power tool according to claim 1, wherein the shaft portion is tube shaped.

* * * * *